(12) United States Patent
Kochetov et al.

(10) Patent No.: US 9,995,339 B2
(45) Date of Patent: Jun. 12, 2018

(54) TURBO MACHINE WITH MAGNETIC BEARINGS

(75) Inventors: Dmitry Kochetov, Moscow (RU); Frank Wiebe, Dormagen-Gohr (DE)

(73) Assignee: ATLAS COPCO ENERGAS GMBH, Cologne (DE)

(*) Notice: Subject to any disclaimer, the term of this patent is extended or adjusted under 35 U.S.C. 154(b) by 1656 days.

(21) Appl. No.: 13/449,977

(22) Filed: Apr. 18, 2012

(65) Prior Publication Data

US 2013/0017062 A1     Jan. 17, 2013

(30) Foreign Application Priority Data

Jul. 15, 2011    (DE) .................. 10 2011 051 885

(51) Int. Cl.
    *F01D 25/16*      (2006.01)
    *F04D 29/058*     (2006.01)
    *F16C 32/04*      (2006.01)

(52) U.S. Cl.
    CPC ...... *F16C 32/0446* (2013.01); *F16C 2360/24* (2013.01)

(58) Field of Classification Search
    CPC ........ F01D 21/003; F01D 21/08; F01D 21/04; F01D 17/02; F01D 25/16; F04D 29/048; F04D 29/058; F05D 2240/51; F05D 2240/511; F05D 2240/515
    USPC ....................................... 415/118, 229, 216.1
    See application file for complete search history.

(56) References Cited

U.S. PATENT DOCUMENTS

| | | | | |
|---|---|---|---|---|
| 3,917,988 | A * | 11/1975 | Payne | 318/400.4 |
| 4,160,204 | A * | 7/1979 | Holmgren et al. | 324/207.16 |
| 5,248,239 | A * | 9/1993 | Andrews | 415/104 |
| 5,640,472 | A * | 6/1997 | Meinzer et al. | 385/26 |
| 6,310,414 | B1 * | 10/2001 | Agahi et al. | 310/40.5 |
| 7,964,982 | B2 * | 6/2011 | Bosen | 290/52 |

\* cited by examiner

*Primary Examiner* — Ninh H Nguyen
(74) *Attorney, Agent, or Firm* — Andrew Wilford

(57) ABSTRACT

A turbomachine has a housing, a rotor shaft centered on an axis, and a plurality of bearings supporting the shaft in the housing for rotation about the axis. At least one of the bearings is an active magnetic bearing. An impeller is fixed on the rotor shaft. A copper layer is fixed to a surface of the rotor shaft and rotatable therewith. A sensor fixed in the housing adjacent the shaft surface can detect the copper layer and generate an output corresponding to a position of the layer from the sensor fixed in the housing. A controller connected between the sensor means and the active magnetic bearing shifts the rotor in the housing in accordance with the output.

7 Claims, 3 Drawing Sheets

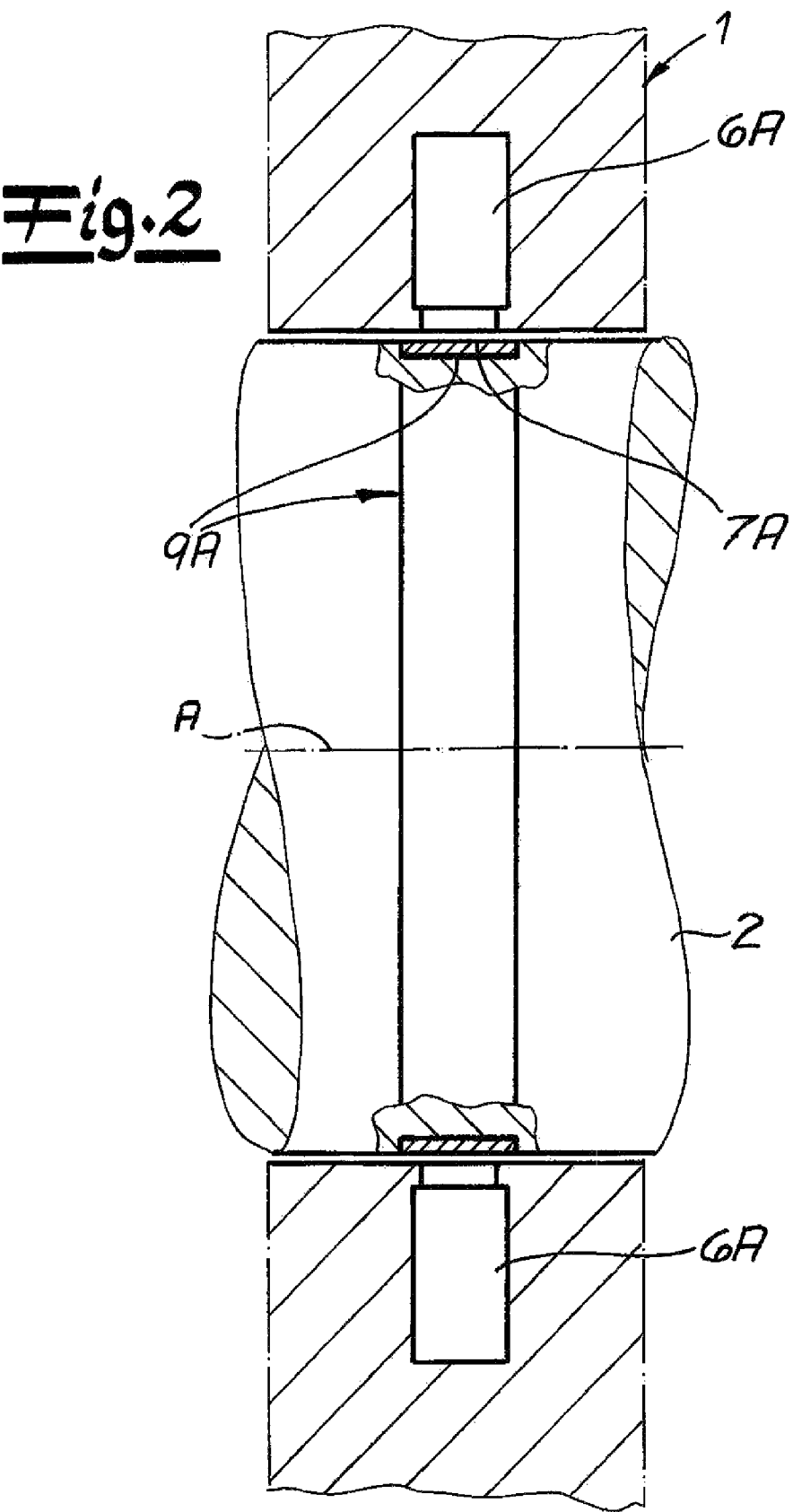

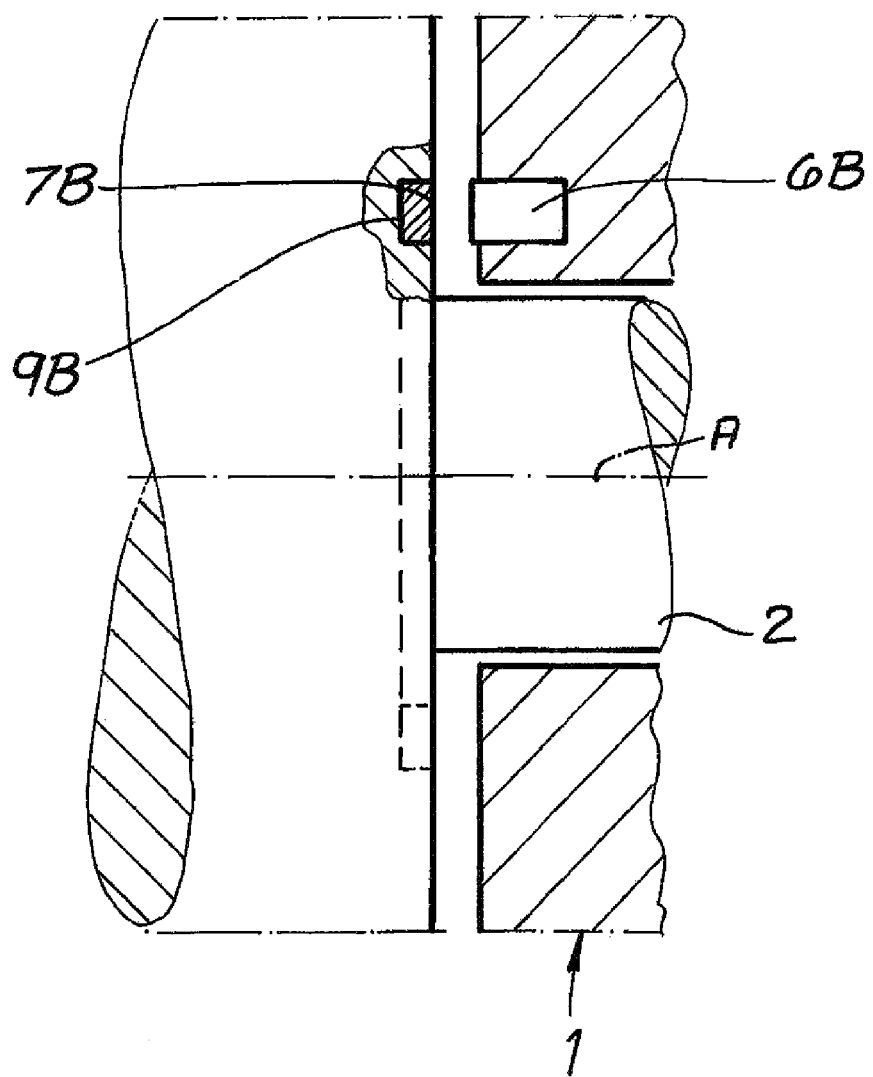

TURBO MACHINE WITH MAGNETIC BEARINGS

FIELD OF THE INVENTION

The present invention relates to a turbomachine. More particularly this invention concerns a turbomachine whose rotor is supported on magnetic bearings.

BACKGROUND OF THE INVENTION

A typical turbomachine has a housing, a rotor shaft carrying at least one impeller, a bearing assembly having at least one active magnetic bearing supporting the rotor shaft in the housing, at least one gap sensor and a controller connected to the gap sensor for controlling the active magnetic bearing. In order to make it possible to precisely determine position with the gap sensor, a target interacting with the gap sensor is is provided on the rotor shaft.

Magnetic bearings operate without contact and thus wear and are therefore suitable to a special extent for rapidly turning installations such as turbomachines. A gap remains between the rotor parts and confronting stator parts of the magnetic bearing, which gap is to be kept as constant as possible. In particular direct contact due to tilting, impact, or the like must be avoided. In the case of an active magnetic bearing the rotor position is therefore continuously monitored by the gap sensor and restoring forces are then supplied by a corresponding actuation of the magnetic bearing to force the rotor, that is the rotor shaft, back into a desired position.

In order to make possible a constant position determination with the gap sensor, a target interacting with the gap sensor is provided on the rotor shaft and must be provided during manufacture of the rotor shaft.

With turbomachines in practice fine disk packs that are attached during manufacture of the rotor shaft are generally used as a target. To this end the disk packs are preassembled, premachined, shrunk onto the rotor shaft and then finely machined down to the outer diameter of the rotor shaft. The interaction of the disk unit and the gap sensor produces a signal depending on the spacing and thus the precise position of the shaft is determined. This approach has proven useful in practice. The production expenditure and thus the production costs are high, however, and the outer diameter of the rotor shaft is increased by the assembly of the disk unit.

OBJECTS OF THE INVENTION

It is therefore an object of the present invention to provide an improved turbo machine with magnetic bearings.

Another object is the provision of such an improved turbo machine with magnetic bearings that overcomes the above-given disadvantages, in particular whose production costs are reduced with no loss of functionality.

SUMMARY OF THE INVENTION

A turbomachine has according to the invention a housing, a rotor shaft centered on an axis, and a plurality of bearings supporting the shaft in the housing for rotation about the axis. At least one of the bearings is an active magnetic bearing. An impeller is fixed on the rotor shaft. A copper layer is fixed to a surface of the rotor shaft and rotatable therewith. A sensor fixed in the housing adjacent the shaft surface can detect the copper layer and generate an output corresponding to a position of the layer relative to the housing, or more accurately from the sensor fixed in the housing. A controller connected between the sensor means and the active magnetic bearing shifts the rotor in the housing in accordance with the output.

According to the invention the copper layer is applied directly to the base material of the rotor shaft. The layer of copper is characterized by good conductivity, so that without the use of disks a measuring signal can be reliably generated with the gap sensor, from which measuring signal the current spacing between the gap sensor and the rotor shaft can be determined. Production is considerably simplified compared to the assembly of a disk unit. Furthermore, the space needed for the copper layer is much smaller than for a disk unit. In particular, the copper layer can also be provided in a groove of the rotor shaft, so that then the target formed by the copper layer can be made flush with the surface of the rotor shaft or can project only slightly therefrom.

In addition to lower production and assembly costs, the rotor dynamics can also be improved by the smaller diameter.

Within the scope of the invention, the gap sensor can be provided for radial position determination in that the copper layer is provided on a radially outwardly directed surface of the rotor shaft. A sensor assembly of this type is provided in order to control an active radial magnetic bearing.

According to an alternative embodiment of the invention the gap sensor is provided for axial position determination in that the copper layer is then provided on an end face of the rotor shaft. Within the scope of the invention, "end face" means a surface of the rotor shaft that extends perpendicular to the rotation axis. It can thereby be not only be on an end of the rotor shaft, but also on a step, enlargement or the like.

Finally, within the scope of the invention the bearing assembly can also have at least one active axial magnetic bearing and at least one active radial magnetic bearing, at least one gap sensor and a target of a copper layer being provided on the rotor shaft to control both magnetic bearings. As described above, one copper layer preferably is provided on the outer surface of the rotor shaft while the other copper layer extends perpendicular to the rotation axis on an end face.

In order to make continuous position determination possible, the target in the form of the copper layer is usually annular whether on an end face or on the outer surface.

In order to increase the accuracy of the position determination, several gap sensors can be provided for a normally annular target, the gap sensors being angularly offset in an is annular array. Then it is also possible to calculate any faults by a difference calculation or by a comparison of the sensor signals, a certain redundancy making it possible to compensate for the failure of one sensor. Finally, it is easy to determine when one of several sensors is supplying a distorted signal.

Further embodiments of the turbomachine are not restricted within the scope of the invention. In particular, the turbomachine can be a compressor, an expander or a compander with at least one compressor stage and one expansion stage.

BRIEF DESCRIPTION OF THE DRAWING

The above and other objects, features, and advantages will become more readily apparent from the following description, reference being made to the accompanying drawing in which:

FIG. 2 is a detailed view of a rotor shaft of the turbomachine in the region of a sensor for determining radial position; and FIG. 3 is a detailed view of the rotor shaft in the region of a gap sensor for determining axial position.

DETAILED DESCRIPTION

Figure 1:
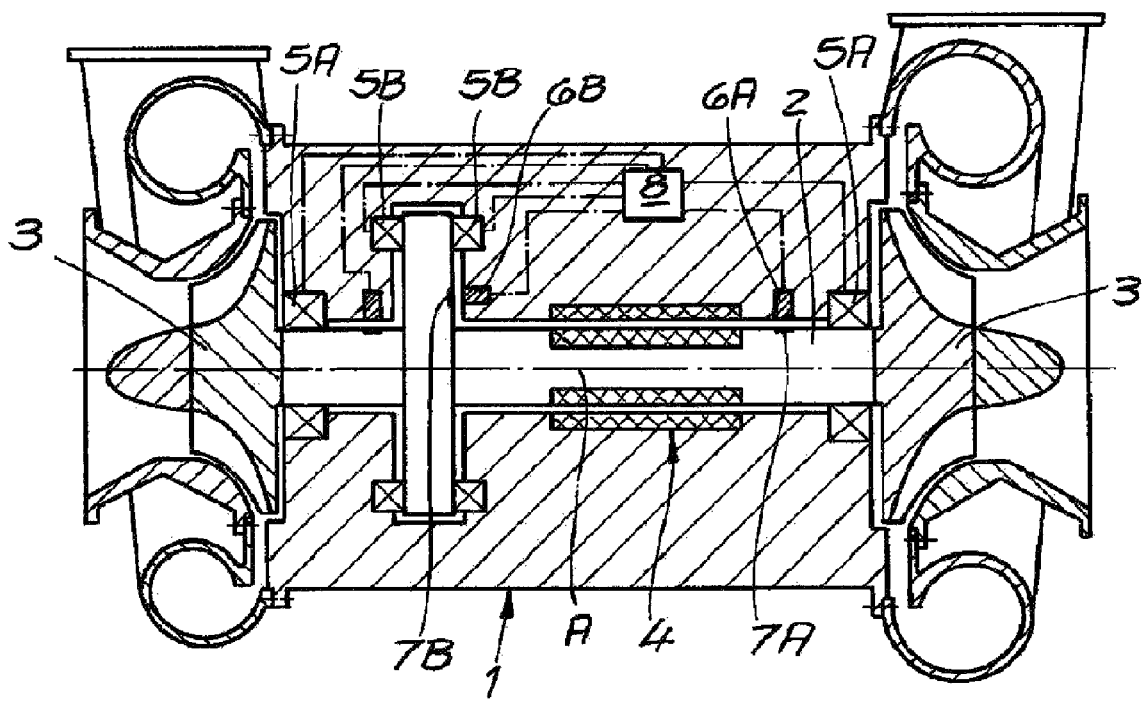
FIG. 1 is a partly schematic axial section through a turbomachine according to the invention.

As seen in FIG. 1 a turbomachine generally comprises a housing 1 and a rotor shaft 2 supported in the housing 1 for rotation about an axis A. Here, the rotor shaft 2 carries at its opposite ends two impellers 3 that are cantilevered, that is only mounted from one side on the shaft. These impellers 3 are provided for the compression or expansion of a working fluid. Furthermore, an electric machine 4 is shown that is a generator or a motor depending on how the turbomachine is operated.

The turbomachine has a bearing assembly that in the illustrated embodiment has two active radial magnetic bearings 5A and two active axial magnetic bearings 5B. In order to be able to detect and compensate for deviations from a desired position at the magnetic bearings 5A and 5B, gap sensors 6A and 6B are provided that interact with respective targets 7A and 7B on the rotor shaft 2. The spacing between the gap sensors 6A and 6B and the respective targets 7A and 7B can be determined by gap sensors 6A and 6B connected to a controller 8 that controls current flow through coils of the magnetic bearings 5A and 5B depending on the sensor output signals in order to generate restoring forces in the radial or axial direction on deviation of the rotor shaft 2 from a desired position.

FIGS. 2 and 3 show in large scale by way of example the regions of the gap sensors 6A or 6B for the radial or axial position determination in a diagrammatic representation.

According to FIG. 2, a copper layer applied onto a base material of the rotor shaft 2 is provided as the target 7A and extends angularly as an annulus around an outer surface of the rotor shaft 2. The copper layer lies in a radially outwardly open rectangular-section annular groove 9A formed in the cylindrical outer surface of the rotor shaft 2, so that the copper layer is integrated into the surface of the rotor shaft 2 in a flush manner. The respective gap sensor 6A can thus be provided at a small spacing from the rotor shaft 2. FIG. 2 furthermore shows that several gap sensors 6A can be provided for radial position determination, in order to increase measuring accuracy and/or to improve the reliability of the measurement.

According to FIG. 3, a similar embodiment is provided to determine the axial position. Its copper layer interacts with the respective sensor 6B and is the target 7B on an end face of the rotor shaft 2 extending perpendicular to the rotation axis A of the rotor shaft 2. This copper layer is also set in a respective groove 9B of the end face so that the target 7B concentrically surrounds the rotor shaft 2. Several sensors 6B can also be provided for axial determination, axially offset from one another in an annular array.

The copper layers as targets 7A, 7B are provided is directly during manufacture of the rotor shaft 2. In contrast to the assembly of disk units known from the prior art, a substantial simplification and thus also a reduction of production costs results.

We claim:

1. A turbomachine comprising:
   a housing;
   a rotor shaft centered on an axis, having an outer surface, and formed with an annular groove centered on the axis;
   a plurality of bearings supporting the shaft in the housing for rotation about the axis, at least one of the bearings being an active magnetic bearing;
   an impeller fixed on the rotor shaft;
   an annular copper layer fixed in the groove and rotatable with the rotor shaft;
   gap sensor means fixed in the housing adjacent the groove for detecting the copper layer and generating an output corresponding to a position of the layer relative to the housing; and
   control means connected between the sensor means and the active magnetic bearing for shifting the rotor shaft in the housing in accordance with the output.

2. The turbomachine defined in claim 1, wherein the copper layer has an outer surface flush with the shaft surface.

3. The turbomachine defined in claim 2, wherein the groove opens radially outward from the axis and the sensor means is radially spacedly juxtaposed with it.

4. The turbomachine defined in claim 2, wherein the groove opens axially and the sensor means is axially spacedly juxtaposed with it.

5. The turbomachine defined in claim 1, wherein there are a plurality of the gap sensor means connected to the control means, juxtaposed with the annular copper layer, and angularly offset from one another in an annular array.

6. The turbomachine defined in claim 1, wherein there are two such grooves, one of which is directed axially and the other of which is directed radially outwardly, two such gap sensor means respectively juxtaposed with the grooves and both connected to the control means, and two such active magnetic bearings, one of which is effective on the shaft axially and the other of which is effective radially on the shaft.

7. A turbomachine comprising:
   a housing;
   a rotor shaft centered on an axis and having a radially outwardly directed surface centered on the axis and formed with a groove centered on the axis and an axially directed surface formed centered on the axis with a groove;
   an active axially effective magnetic bearing supporting the shaft in the housing for rotation about the axis and energizable to shift the shaft parallel to the axis in the housing;
   an active radially effective magnetic bearing supporting the shaft in the housing and energizable to radially shift the shaft in the housing;
   an impeller fixed on the rotor shaft;
   respective annular copper layers set in the grooves, having outer faces flush with the respective surfaces, and rotationally fixed to the rotor shaft and for joint rotation therewith;
   respective gap sensors fixed in the housing adjacent the shaft surfaces for detecting the respective copper layers and generating respective outputs corresponding to positions of the respective copper layers relative to the housing; and
   control means connected between the sensor means and the active magnetic bearings for shifting the rotor in the housing in accordance with the outputs.

* * * * *